United States Patent
Zhu et al.

(10) Patent No.: US 12,555,346 B2
(45) Date of Patent: Feb. 17, 2026

(54) AUTOMATIC WORKING SYSTEM, AUTOMATIC WALKING DEVICE AND CONTROL METHOD THEREFOR, AND COMPUTER-READABLE STORAGE MEDIUM

(71) Applicant: Suzhou Cleva Precision Machinery & Technology Co., Ltd., Suzhou (CN)

(72) Inventors: Shaoming Zhu, Suzhou (CN); Xue Ren, Suzhou (CN)

(73) Assignee: Suzhou Cleva Precision Machinery & Technology Co., Ltd., Suzhou (CN)

(*) Notice: Subject to any disclaimer, the term of this patent is extended or adjusted under 35 U.S.C. 154(b) by 590 days.

(21) Appl. No.: 17/768,011

(22) PCT Filed: Aug. 14, 2020

(86) PCT No.: PCT/CN2020/109268
§ 371 (c)(1),
(2) Date: Apr. 11, 2022

(87) PCT Pub. No.: WO2021/184663
PCT Pub. Date: Sep. 23, 2021

(65) Prior Publication Data
US 2024/0099186 A1  Mar. 28, 2024

(30) Foreign Application Priority Data
Mar. 19, 2020 (CN) .................. 202010197055.1

(51) Int. Cl.
*G06K 9/00* (2022.01)
*A01D 34/00* (2006.01)
(Continued)

(52) U.S. Cl.
CPC .......... *G06V 10/26* (2022.01); *A01D 34/008* (2013.01); *G05D 1/0238* (2013.01);
(Continued)

(58) Field of Classification Search
CPC ........ G06V 10/26; G06V 10/44; G06V 10/50; G06V 10/751; G06V 20/58; G06T 7/11;
(Continued)

(56) References Cited

U.S. PATENT DOCUMENTS 9,761,000 B2 *  9/2017  Dane .................. G06V 20/56
2017/0084038 A1 *  3/2017  Dane .................. G06T 7/20
(Continued)

FOREIGN PATENT DOCUMENTS

CN   104111653   10/2014
CN   105467985   4/2016
(Continued)

OTHER PUBLICATIONS

Water-Filling: A Novel Way for Image Structural Feature Extraction, Xiang Sean Zhou et al., IEEE, 1999, pp. 570-574 (Year: 1999).*

(Continued)

*Primary Examiner* — Jayesh A Patel
(74) *Attorney, Agent, or Firm* — JK Intellectual Property Law, PA

(57) ABSTRACT

A self-working system, a self-walking device, a control method therefor and a computer-readable storage medium are disclosed, wherein the control method may include the following steps: acquiring a captured image; processing the captured image to acquire a processed image; segmenting the processed image into at least one sub-region; respectively acquiring a representative pixel point $PL_n$ of each sub-region; calculating, in the processed image, the number of sub-regions of which the representative pixel point $PL_n$ is located below a comparison pixel point $P_C$ and marking same as the number $N_b$ of special sub-regions, $P_C$ being a preset comparison pixel point; if $N_b \leq 1$, judging that there is a boundary (2) or obstacle in the distance of the captured (Continued)

image; if $N_b>1$, judging that there is a boundary (2) or obstacle in the vicinity of the captured image. The subsequent work of the self-walking device is directly judged by means of machine vision, which is more convenient and also makes the control more sensitive and effective. Furthermore, an erroneous judgement caused by recognition of a boundary (2) or obstacle on a slope can be effectively avoided, so that the control is more accurate.

12 Claims, 3 Drawing Sheets

(51) Int. Cl.

| | | |
|---|---|---|
| *G05D 1/00* | (2006.01) | |
| *G06T 7/11* | (2017.01) | |
| *G06V 10/26* | (2022.01) | |
| *A01D 101/00* | (2006.01) | |

(52) U.S. Cl.
CPC .............. *G05D 1/0246* (2013.01); *G06T 7/11* (2017.01); *A01D 2101/00* (2013.01); *G06T 2207/20112* (2013.01); *G06T 2207/30261* (2013.01)

(58) Field of Classification Search
CPC . G06T 2207/20112; G06T 2207/30261; G06T 7/73
See application file for complete search history.

(56) References Cited

U.S. PATENT DOCUMENTS

| | | | | |
|---|---|---|---|---|
| 2018/0158193 | A1* | 6/2018 | Dane | ........................ G06T 7/507 |
| 2019/0333229 | A1* | 10/2019 | Dane | ......................... G06T 7/11 |

FOREIGN PATENT DOCUMENTS

| | | | | |
|---|---|---|---|---|
| CN | 105785986 | | 7/2016 | |
| CN | 108596012 | | 9/2018 | |
| WO | WO-2014173290 | A1 * | 10/2014 | ............. G06V 20/56 |
| WO | WO-2017206950 | A1 * | 12/2017 | ............. A01D 34/00 |

OTHER PUBLICATIONS

Multiresolution-based watersheds for efficient image segmentation, Jong-Bae Kim et al., Elsevier, 2003, pp. 473-488 (Year: 2003).*
Intelligent Auto-Saving Energy Robotic Lawn Mower, Guo-Shing Huang et al., IEEE, 2010, pp. 4130-4136 (Year: 2010).*
Embedded Robust Visual Obstacle Detection on Autonomous Lawn Mowers, Mathias Franzius et al., IEEE, 2017, pp. 1-9 (Year: 2017).*
Vision-Based Obstacle Detection and Avoidance for the CWRU Cutter Autonomous Lawnmower, Alexander Schepelmann et al., IEEE, 2009, pp. 218-223 (Year: 2009).*
International Search Report for Application No. PCT/CN2020/109268, dated Dec. 23, 2020.

* cited by examiner

AUTOMATIC WORKING SYSTEM, AUTOMATIC WALKING DEVICE AND CONTROL METHOD THEREFOR, AND COMPUTER-READABLE STORAGE MEDIUM

CROSS-REFERENCE TO RELATED PATENT APPLICATIONS

This application is a national stage of International Application No. PCT/CN2020/109268, filed on Aug. 14, 2020, which claims priority to CN patent application Ser. No. 20/201,0197055.1, filed on Mar. 19, 2020. All of the aforementioned applications are hereby incorporated by reference in their entireties.

CROSS-REFERENCE TO RELATED PATENT APPLICATIONS

This application is a national stage of International Application No. PCT/CN2020/109268, filed on Aug. 14, 2020, which claims priority to CN patent application Ser. No. 20/201,0197055.1, filed on Mar. 19, 2020. All of the aforementioned applications are hereby incorporated by reference in their entireties.

TECHNICAL FIELD

The disclosure relates to the field of intelligent control, in particular to a self-working system, a self-walking device, a control method therefor and a computer-readable storage medium.

BACKGROUND

With the continuous progress of computer technology and artificial intelligence technology, self-walking device and self-working system of intelligent robots have slowly entered people's lives, such as intelligent sweeping robots and intelligent mower. Usually, this kind of intelligent robot is small in size, integrated with sensing means, driving means, batteries, etc., without manual control, and can travel and work in a specified area. In addition, when the battery power is insufficient, it can automatically return to the charging station, connect with the charging station and charge, and continue to travel and work after charging.

For the existing intelligent mower, the working area of the existing self-working system is a large lawn, and the boundary is mostly an electrified device buried under the ground, so that the intelligent mower can sense it. However, if the boundary line is buried under the ground, it will cost more manpower and material resources. And the boundary line needs certain requirements, for example, the angle of the corner should not be less than 90 degrees, which limits the shape of the lawn for the intelligent mower to a certain extent. Therefore, an improved way is to set boundaries on the lawn and judge boundaries or obstacles by machine vision.

However, because the camera of the lawn mower is in a fixed position, when the lawn mower does not walk on the plane, it may capture the boundaries or large obstacles far away, which leads to the robot misjudging that it has reached the boundaries or obstacles and affects the subsequent work of the robot.

Therefore, it is necessary to design a self-working system that can judge boundaries or obstacles more accurately, and corresponding self-walking device, control method and computer-readable storage medium.

SUMMARY

To solve one of the above problems, the disclosure provides a control method of a self-walking device, which comprises the following steps: acquiring a captured image; processing the captured image to acquire a processed image; segmenting the processed image into at least one sub-region; respectively acquiring the representative pixel point $PL_n$ of each sub-region; calculating, in the processed image, the number of sub-regions of which the reprehensive pixel point $PL_n$ is located below the comparison pixel point $P_C$ and marking as the number $N_b$ of special sub-regions, $P_C$ being the preset comparison pixel point; if $N_b \leq 1$, judging that there is a boundary or obstacle in the distance of the captured image; If $N_b > 1$, judging that there is a boundary or obstacle in the vicinity of the captured image.

As a further improvement of the present disclosure, the step of "respectively acquiring representative pixel points PLN of each sub-region" comprises respectively acquiring the lowest pixel points in the vertical direction of each sub-region and marking as representative pixel points $PL_n$.

As a further improvement of the present disclosure, the step of "presetting a comparison pixel $P_C$" comprises presetting a comparison line extending in a horizontal direction, the comparison pixel $P_C$ being located on the comparison line.

As a further improvement of the present disclosure, the step of "processing the captured image to acquire a processed image" comprises: carrying out bilateral filtering processing on the captured image to generate a filtered image; normalizing the filtered image to generate a standard mode image; segmenting the standard mode image to generate a segmented image; filling the segmented image with water, acquiring a filled image and marking as the processed image.

As a further improvement of the disclosure, in the step of "segmenting the standard mode image", the Pyramid Mean Shift algorithm is adopted for image segment.

As a further improvement of the present disclosure, the step of "segmenting the processed image into at least one sub-region" comprises segmenting the processed image into at least one sub-region according to color.

As a further improvement of the present disclosure, the step of "acquiring a captured image" comprises: acquiring an inclination angle $A_m$ of a maximum slope within a working area of the self-walking device; the step of "presetting the comparison pixel point $P_C$" specifically comprises: adjusting the position of the comparison pixel point $P_C$ according to $A_m$, and the larger the $A_m$, the closer the position of the $P_C$ being to the bottom of the captured image.

As a further improvement of the present disclosure, the comparison pixel point $P_C$ is located at a central position of the processed image in the vertical direction.

To solve one of the above problems, the disclosure provides a self-working system, which comprises: a self-walking device operable according to the control method as described above; a boundary arranged in an annular shape and formed a working area for defining the self-walking device, and the boundary extending upward from the ground.

In order to solve one of the above problems, the disclosure also provides a self-working system, which comprises: a self-walking device operable according to the above control method; a working area provided with a non-working area along the outer side of the edge of the working area, and the geology of the working area and the non-working area being different and forming a boundary.

To solve one of the above problems, the disclosure provides a self-walking device, comprises a main body, a traveling module, a power supply module, a memory and a processor arranged in the main body, the memory stored a computer program that can be run on the processor, and is wherein the self-walking device further comprises a camera arranged on the main body, and the shooting direction of the camera facing the front side of the self-walking device along the traveling direction; when the processor executes the computer program, the steps of the control method of the self-walking device as described above can be implemented.

To solve one of the above problems, the present disclosure provides a computer-readable storage medium storing a computer program thereon, when the computer program is executed by a processor, the steps in the control method of the self-walking device as described above can be implemented.

Compared with the prior art, if the number $N_b$ of the special sub-areas exceeds one, it means that the number of the special sub-areas is large, and it can be judged that besides lawns, there are boundaries or large obstacles in the vicinity of the captured image, therefore self-walking device is required to carry out operations such as retreating and turning to avoid; on the contrary, there are boundaries or obstacles in the distance of the captured image, and the self-walking device can continue to travel and work. Therefore, the distance between the self-walking device and the boundaries and obstacles can be acquired by analyzing the captured images, so as to make subsequent judgment and control. It is more convenient to judge the subsequent work of self-walking device directly through machine vision, and it also makes the control more sensitive and effective. Moreover, combined with the method of boundary recognition through machine vision, it can effectively avoid the misjudgment caused by identifying boundaries or obstacles on slopes, and make the control more accurate.

DETAILED DESCRIPTION

In order for those in the art to have a better understanding of the technical aspects of the present disclosure, a clear and complete description of the technical aspects of the embodiments of the present disclosure will be given below in conjunction with the accompanying drawings in the embodiments of the present disclosure, and it will be apparent that the described embodiments are only part of the embodiments of the present disclosure, not all of them. Based on the embodiments in the present disclosure, all other embodiments acquired by those of ordinary skill in the art without making creative efforts should fall within the scope of protection of the present disclosure.

In the various illustrations of the present application certain dimensions of the structure or portion may be exaggerated with respect to other structures or portions for ease of illustration and therefore are only used to illustrate the basic structure of the subject matter of the present application.

The self-walking device of the disclosure can be an automatic lawn mower, an automatic vacuum cleaner and the like, which can automatically walk in a working area to carry out mowing and vacuuming work. In the specific example of the disclosure, the self-walking device is taken as a lawn mower for specific description, and correspondingly, the working area can be a lawn. Of course, self-walking device is not limited to lawn mowers and vacuum cleaners, but can also be unattended device suitable for other device, such as spraying device, snow removal device, monitoring device, etc.

Figure 1:
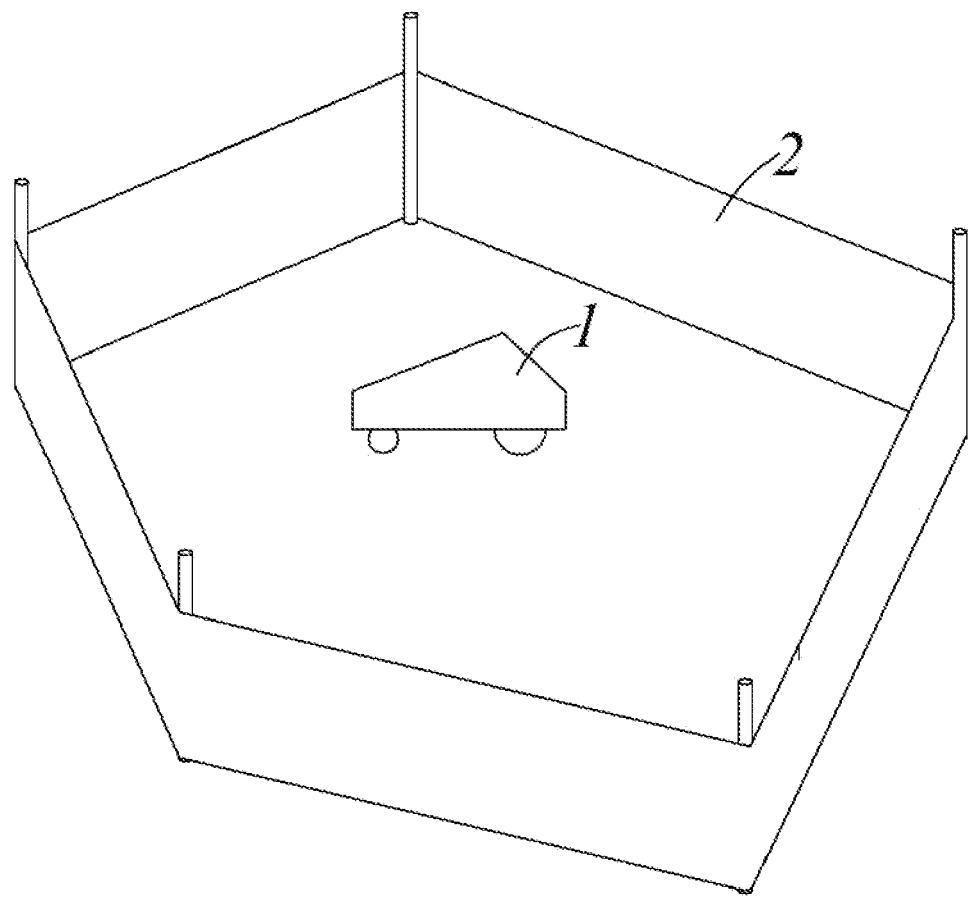
FIG. 1 is a structural schematic diagram of the self-working system of the present disclosure.
Figure 2:
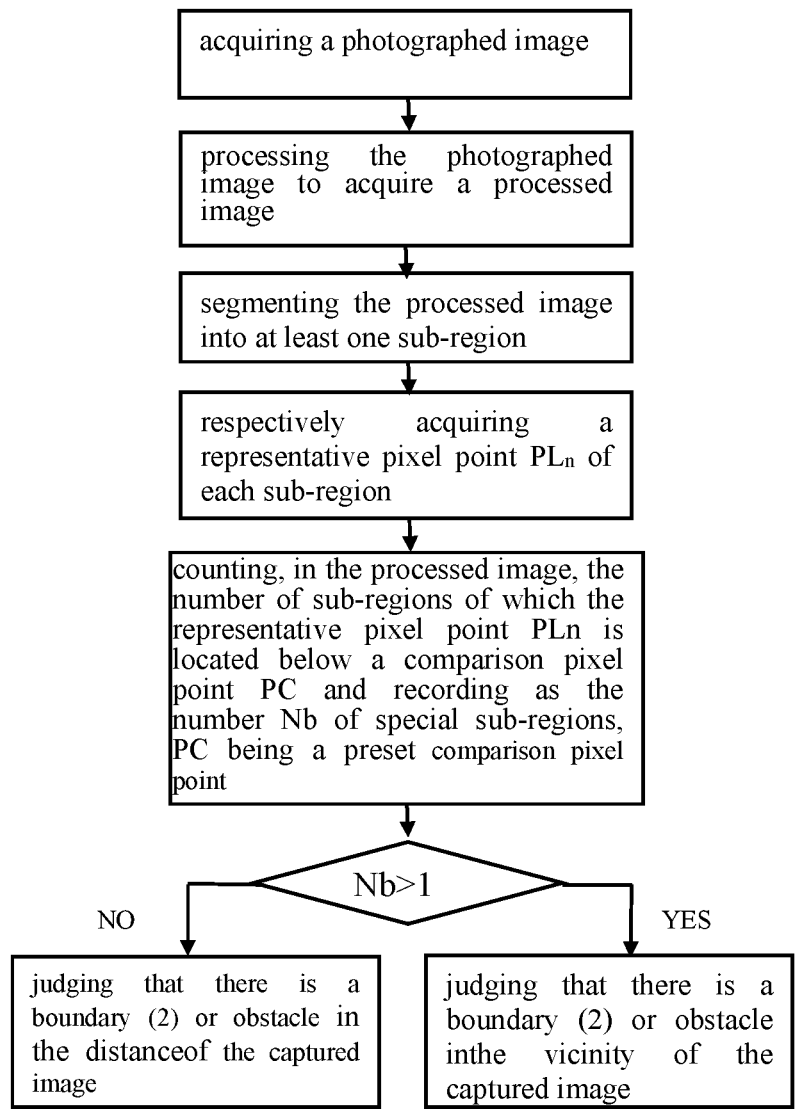
FIG. 2 is a flow diagram of the control method of the self-walking device of the present disclosure.
Figure 3:
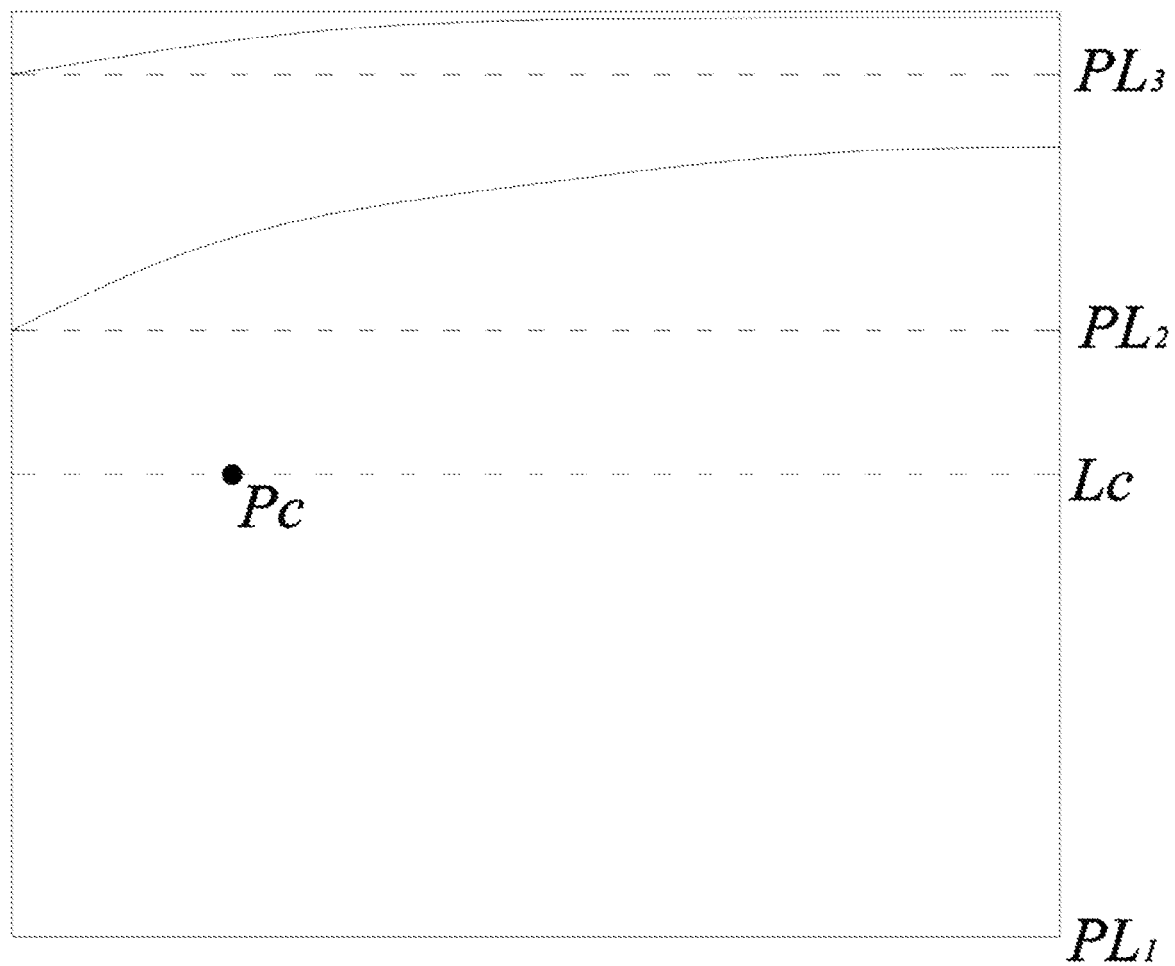
FIG. 3 is a schematic diagram of a processed image in the control method of the self-walking device of the present disclosure.

As shown in FIGS. 1 to 3, there is provided a control method of a self-walking device 1, which comprises:
  acquiring a captured image;
  processing the captured image to acquire a processed image;
  segmenting the processed image into at least one sub-region;
  respectively acquiring a representative pixel point $PL_n$ of each sub-region;
  calculating, in the processed image, the number of sub-regions of which the reprehensive pixel point $PL_n$ is located below the comparison pixel point $P_C$ and marking as the number of special sub-regions $N_b$, the $P_C$ being a preset comparison pixel point;

If $N_b \leq 1$, judging that there is a boundary 2 or obstacle in the distance of the captured image;

If $N_b > 1$, judging that there is a boundary 2 or obstacle in the vicinity of the captured image.

Therefore, in the present disclosure, by processing and segmenting the captured image, at least one sub-region can be formed. Since the lawn region must be located lower in the picture taken by the self-walking device 1, if the representative pixel point $PL_n$ of the sub-region is located lower than the comparison pixel point $P_C$, the sub-region must be the lawn region or a closer boundary 2 or an obstacle.

Therefore, if the number $N_b$ of the special sub-areas exceeds one, it means that the number of the special sub-areas is large, and it can be judged that in addition to the lawn, there is a near boundary 2 or a large obstacle in the vicinity of the captured image, therefore the self-walking device 1 needs to perform operations such as retreating and turning to avoid; conversely, there is a boundary 2 or obstacle in the distance of the captured image, and the self-walking device 1 can continue to travel and work. Thus, the distance between the self-walking device 1 and the boundary 2 and the obstacle can be acquired by analyzing the captured image for subsequent judgment and control. The subsequent work of the self-walking device 1 is directly judged by machine vision, which is more convenient and makes the control more sensitive and effective.

Specifically, if the number $N_b$ of special sub-areas does not exceed one, it means that there is only a lawn in the vicinity of the self-walking device 1. When the self-walking device 1 travels on a horizontal ground, if the number $N_b$ of special sub-regions still does not exceed one, then it means that the boundary 2 or the obstacle is still far away, and the self-walking device 1 can continue to travel and work until the distance between the boundary 2 or the obstacle is close and the special sub-area of the boundary 2 or the obstacle extends below the comparison pixel $P_C$, and then it means that the self-walking device 1 is close to the boundary 2 or the obstacle.

For example, as shown in FIG. 3, the comparison pixel is $P_C$ and the processed image is obviously segmented into three sub-regions where $PL_1$, $PL_2$ and $PL_3$ are representative pixels of the corresponding sub-regions respectively. Among them, only $PL_1$ is located below the $P_C$, so that $N_b=1$, it is judged that there is a boundary 2 or obstacle in the distance of the captured image, and the self-walking device can also travel freely.

Particularly, when the self-walking device travels on a slope, for example, when the self-walking device 1 travels on an uphill section, the camera of the self-walking device 1 will still take pictures of the distance boundary 2 or obstacles even though the distance is far away. However, since the special sub-area corresponding to the boundary 2 or the obstacle is located above the comparison pixel $P_C$ after all, the self-walking device1 will judge that the boundary 2 or the obstacle is far away and will not affect the continuous operation of the self-walking device1. Therefore, with the technical proposal of the disclosure, combined with the method of recognizing the boundary 2 through machine vision, the misjudgment caused by recognizing the boundary 2 or obstacles on the slope can be effectively avoided, and the control is more accurate.

In addition, although the boundary 2 and the like are regularly patterned by the camera, certain distortion still appears in the captured image. Therefore, in the present disclosure, the step of "respectively acquiring the representative pixel point $PL_n$ of each sub-region" comprises respectively acquiring the lowest pixel point in the vertical direction of each sub-region and marking as the representative pixel point $PL_n$.

For example as shown in FIG. 3, $PL_1$, $PL_2$ and $PL_3$ are respectively the lowest pixel points of the sub-region in the vertical direction, i.e. representative pixel points.

Therefore, it is more reasonable and more convenient to use the representative pixel point $PL_n$ and the comparison pixel point $P_C$ at the lowest position of the sub-region in the vertical direction for judgment. Of course, if the representative pixel point $PL_n$ is judged by other means, the object of the present disclosure can also be achieved.

In addition, in the present disclosure, the step of "presetting the comparison pixel point $P_C$" comprises presetting a comparison line $L_C$ extending in the horizontal direction, and the comparison pixel point $P_C$ is located on the comparison line $L_C$. That is, the comparison pixel point $P_C$ may be set on a pre-set comparison line $L_C$, and the comparison may be implemented based on whether the representative pixel point $PL_n$ is located above or below the comparison line $L_C$ during comparison. Alternatively, the comparison line $L_C$ segments the processed image into an upper half area and a lower half area, and the positional relationship between the representative pixel point $PL_n$ and the comparison pixel point $P_C$ may be judged if it is judged that the representative pixel point $PL_n$ is located in the upper half area or the lower half area.

As shown in FIG. 3, the comparison line $L_C$ is a horizontal line and the comparison pixel point $P_C$ is located on the comparison line $L_C$.

In the present disclosure, the captured image needs to be processed and analyzed to acquire a processed image, and then the processed image is segmented into at least one sub-region. Among them, it is obvious that at least one sub-region may be included in the processed image.

The disclosure provides a specific embodiment, which can process a captured image to form a processed image as described above. Specifically, the step of "processing the captured image to acquire a processed image" comprises:

carrying out bilateral filtering processing on the captured image to generate a filtered image;

normalizing the filtered image to generate a standard mode image;

segmenting the standard mode image to generate a segmented image;

filling the segmented image with water, acquiring a filled image and marking as a processed image.

Among them, bilateral filtering is a nonlinear filtering method, which combines the spatial proximity of images with the similarity of pixel values, and considers the spatial information and gray similarity simultaneously, so as to achieve the purpose of edge-preserving denoising. It is simple, non-iterative and local.

Normalization refers to the process of transforming an image into a fixed standard form by a series of standard processing transformations.

Image segment is an important pretreatment in image recognition and computer vision. Image segment is based on the brightness and color of pixels in the image, and artificial intelligence is introduced to correct the errors caused by uneven illumination, shadow, unclear image or noise in segment. Through image segment, the image can be roughly processed into an image composed of several different regional color blocks. In the present disclosure, the standard image is thus converted into an image similar to the processed image. Moreover, image segment can be used in many ways, such as threshold-based segment method, region-based segment method, edge-based segment method and specific theory-based segment method. In the disclosure, in the specific step of "image segment of standard mode image", a Pyramid Mean Shift algorithm is adopted for image segment.

Further, since the self-walking device 1 in the present disclosure usually walks on the grass, it is necessary to identify large obstacles or boundaries 2, and the grass only. Therefore, in order to make the final processed image easier to analyze, a flood filling process also performed on the segmented image in the present disclosure. The flood filling process is to fill the connected area by the same color, to achieve the purpose of flood filling by setting the upper and lower limits of connected pixels, and to connect similar pixel areas into a whole by the same color.

With the method, the captured image can be processed to form a processed image, which is convenient for subsequent analysis. As can be seen from the above, after processing, the processed image may comprise at least one sub-region, and the colors between adjacent sub-regions are different.

Thus, the step of "segmenting the processed image into at least one sub-region" comprises segmenting the processed image into at least one sub-region according to color. Because sub-regions belong to different objects, such as grass, stones, fallen leaves, boundary 2, etc., their colors are different, so they can be segmented by color. Of course the color-based segment can also be performed in different ways, for example by calculating the pixel value of each pixel point and the like.

Of course, if the captured image is processed in other ways and the sub-region is segmented by color, or the captured image is processed in other ways and the processed image is segmented in other ways, or the captured image is processed in the above-mentioned ways and the processed image is segmented in other ways, which are within the protection scope of the disclosure.

In addition, as described above, the above embodiment of the present disclosure can judge the distance of the boundary 2 or the obstacle when the boundary 2 or the obstacle is captured. Especially, when walking on slopes, especially uphill areas, the camera on the self-walking device 1 can easily capture the distant boundary 2 and the large obstacle. Therefore, the present disclosure can judge the distance between the boundary 2 and the large obstacle and the self-walking device 1 by comparing the representative pixel point $PL_n$ and the comparison pixel point $P_C$ of the sub-region in the processing image. When $PL_n$ is located on the upper side of the $P_C$, it is judged that the distance is far. Of course the position of the comparison pixel $P_C$ affects the distance judgement result between the self-walking device 1 and the boundary 2 or the large obstacle. Also, the position of the comparison pixel point $P_C$ is related to the maximum slope of the working area of the self-walking device 1.

Therefore, the step of "acquiring a captured image" is preceded by:
  acquiring the inclination angle $A_m$ of the maximum slope in the working area of the self-walking device 1;
  the step of "presetting comparison pixel $P_C$" is as follows:
  adjusting the position of the comparison pixel point $P_C$ according to $A_m$, wherein the larger the Am, the closer the position of the $P_C$ being to the bottom of the captured image.

This is because, the greater the inclination angle of the slope, if the self-walking device 1 is in the process of uphill, it is easier to capture the distant boundary 2 and obstacle, and in the captured image, the distant boundary 2 and obstacle will occupy more pictures from top to bottom, which is equivalent to the sub-area located above extending to the lower, so the position of the comparison pixel $P_C$ is closer to the bottom of the captured image.

Normally, the comparison pixel $P_C$ is located at the middle position of the processing image in the vertical direction. Of course this can be calculated from the angle of inclination $A_m$ of the maximum slope described above and can also be acquired empirically according to most of the usual cases.

The disclosure also provides a self-working system, which comprises:
  a self-walking device 1 operable according to the control method as described above;
  a boundary 2 arranged in an annular shape and used to define the working area of the self-walking device 1, the boundary 2 extending upward from the ground.

In the present disclosure, the self-walking device 1 acquires the traveling area of the self-walking device 1 by acquiring a captured image, and then processing and analyzing the captured image, so that the boundary 2 of the self-working system of the present disclosure must extend upward from the ground, thus it can be captured and recognized by the self-walking device 1.

In addition, the disclosure also provides a self-working system, which comprises:
  a self-walking device 1 operable according to the control method as described above;
  a working area provided with a non-working area along the outer side of the edge of the working area, and the geology of the working area and the non-working area being different and forming a boundary 2.

Since the self-walking device 1 according to the disclosure is used in a lawn mower, the lawn is the working area, and obviously, the non-working area can be bare soil, floor, concrete board, etc., the geology of which is quite different from that of the lawn, and the color of which is also quite different from that of the lawn. Thus, a boundary 2 is naturally formed between the working area and the non-working area due to obvious geological differences, and the boundary 2 is not artificially set but naturally formed. However, the control method of the present disclosure can also be applied due to the obvious color difference between the working area and the non-working area and the formation of the boundary 2.

The disclosure also provides a self-walking device 1, which comprises a main body, a traveling module, a power supply module, a memory and a processor arranged in the main body, wherein the memory stores a computer program which can be run on the processor, and the self-walking device 1 further comprises a camera arranged on the main body, the shooting direction of the camera faces the front side of the self-walking device 1 along the traveling direction; when the processor executes the computer program, the steps of the control method of the self-walking device 1 as described above can be implemented. That is when the processor executes the computer program, the steps of the control method of any of the embodiments of the self-walking device1 described above can be implemented.

As described above the main body of the self-walking device 1 in the present disclosure is provided with a camera so that a captured image can be captured and acquired. Furthermore, the shooting direction of the camera faces the front side of the self-walking device 1 in the traveling direction, so that the camera captures a scene on the front side of the self-walking device 1. Thus, the next movement track of the self-walking device 1 can be analyzed based on the captured image acquired by the self-walking device 1. If it is judged that there is a boundary 2 or obstacle in the distance of the captured image, the self-walking device 1 is controlled to further walk and work; if it is judged that there is a boundary 2 or obstacle in the vicinity of the captured image, the self-walking device 1 is controlled to perform operations such as stopping, turning or retreating.

Likewise, the present disclosure also provides a computer-readable storage medium stored a computer program, when the computer program is executed by a processor, the steps in the control method of the self-walking device 1 as described above are implemented. That is when the processor executes the computer program, the steps of the control method of any of the embodiments of the self-walking device1 described above can be implemented.

In summary, in the present disclosure, if the number $N_b$ of the special sub-areas exceeds one, it means that the number of the special sub-areas is large, and it can be judged that there is a boundary 2 or a large obstacle in the vicinity of the captured image, so that the self-walking device 1 needs to carry out operations such as retreating and turning to avoid; conversely, there is a boundary 2 or an obstacle in the distance of the captured image, and the self-walking device 1 can continue to travel and work. Thus, the distance between the self-walking device 1 and the boundary 2 and the obstacle can be analyzed by analyzing the captured image for subsequent judgment and control. The subsequent work of the self-walking device 1 is directly judged by machine vision, which is more convenient and makes the control more sensitive and effective. In addition, through the technical proposal of the disclosure, combined with the method of recognizing the boundary 2 through machine vision, the misjudgment caused by recognizing the boundary 2 or obstacles on the slope can be effectively avoided, and the control is more accurate.

Further, the disclosure also provides a specific embodiment for processing the captured image, which mainly processes the processed image to include at least one sub-region by carrying out bilateral filtering processing, normalization processing, image segment and flood filling processing on the captured image. Particularly, the Pyramid Mean Shift algorithm is adopted for image segment, so that the processing result of the captured image can better meet the purpose of the disclosure.

In addition, it should be understood that, while this specification is described in accordance with embodiments, however, each embodiment does not contain only an independent technical scheme, and the description is described for clarity only. Those skilled in the art should take the description as a whole, and the technical schemes in each embodiment may be suitably combined to form other embodiments that can be understood by those skilled in the art.

The series of detailed descriptions set forth above are intended to be specific to feasible embodiments of the present disclosure only and are not intended to limit the scope of protection of the present disclosure, and any equivalent embodiments or modifications made without departing from the technical spirit of the present disclosure should be included within the scope of protection of the present disclosure.

The invention claimed is:

1. A control method of a self-walking device, comprising:
acquiring a captured image;
processing the captured image to acquire a processed image;
segmenting the processed image into a number of sub-regions;
respectively acquiring a representative pixel point $PL_n$ of each sub-region;
calculating, in the processed image, the number of sub-regions of which the representative pixel point $PL_n$ is located below a comparison pixel point $P_c$, and marking the number of the sub-regions of which the representative pixel point $PL_n$ is located below the comparison pixel point $P_c$ as a number $N_b$ of special sub-regions, Pc being a preset comparison pixel point;
if $N_{b\leq}1$, judging that there is a boundary or obstacle in the distance of the captured image;
if $N_{b>}1$, judging that there is a boundary or obstacle in the vicinity of captured image.

2. The control method according to claim 1, wherein the step of "respectively acquiring the representative pixel point $PL_n$ of each sub-region" includes respectively acquiring a lowest pixel point in a vertical direction of each sub-region and marking the lowest pixel points as representative pixel points $PL_n$.

3. The control method according to claim 1, wherein the comparison pixel point Pc is determined by presetting a comparison line extending in a horizontal direction, the comparison pixel point Pc being located on the comparison line.

4. The control method according to claim 1, wherein the step of "processing the captured image to acquire the processed image" includes:
carrying out bilateral filtering processing on the captured image to generate a filtered image;
normalizing the filtered image to generate a standard mode image;
segmenting the standard mode image to generate a segmented image;
filling the segmented image with water, acquiring the filled image and marking as a processed image.

5. The control method according to claim 4, wherein in the step of "segmenting the standard mode image", a Pyramid Mean Shift algorithm is employed.

6. The control method according to claim 1, wherein the step of "segmenting the processed image into the number of sub-regions" includes: segmenting the processed image into at least one sub-region according to color.

7. The control method according to claim 1, wherein the step of "acquiring the captured image" is preceded by:
acquiring an inclination angle Am of a maximum slope in a working area of the self-walking device;
the comparison pixel point Pc is determined by adjusting the position of the comparison pixel point Pc according to $A_m$, wherein the larger a value of the $A_m$ is, the closer the position of the comparison pixel point Pc is to a bottom of the captured image.

8. The control method according to claim 1, wherein the comparison pixel point Pc is located at a middle position of the processed image in a vertical direction.

9. An automated working system comprising:
a self-walking device; and
a boundary arranged in an annular shape and formed in a working area for defining the self-walking device, the boundary extending upward from the ground,
wherein the self-walking device performs the following steps:
acquiring a captured image;
processing the captured image to acquire a processed image;
segmenting the processed image into a number of sub-regions;
respectively acquiring a representative pixel point $PL_n$ of each sub-region;
calculating, in the processed image, the number of sub-regions of which the representative pixel point $PL_n$ is located below a comparison pixel point Pc, and marking the number of the sub-regions of which the representative pixel point $PL_n$ is located below the comparison pixel point Pc as a number $N_b$ of special sub-regions, Pc being a preset comparison pixel point;
if $N_{b\leq}1$, judging that there is a boundary or obstacle in the distance of the captured image;
if $Nb_{b>}1$, judging that there is a boundary or obstacle in the vicinity of captured image.

10. An automated operation system comprising:
a self-walking device; and
a working area provided with a non-working area along an outer side of an edge of the working area, and a geology of the working area and the non-working area being different and forming a boundary,
wherein the self-walking device performs the following steps:
acquiring a captured image;
processing the captured image to acquire a processed image;
segmenting the processed image into a number of sub-regions;
respectively acquiring a representative pixel point $PL_n$ of each sub-region;
calculating, in the processed image, the number of sub-regions of which the representative pixel point $PL_n$ is located below a comparison pixel point Pc, and marking the number of the sub-regions of which the representative pixel point $PL_n$ is located below the comparison pixel point Pc as a number $N_b$ of special sub-regions, Pc being a preset comparison pixel point;
if $N_{b\leq}1$, judging that there is a boundary or obstacle in the distance of the captured image;
if $N_{b>}1$, judging that there is a boundary or obstacle in the vicinity of captured image.

11. A self-walking device comprises:

a main body, a traveling module, a power supply module, a memory and a processor arranged in the main body, the memory stores a computer program that can be run on the processor, and wherein the self-walking device further includes a camera arranged on the main body, and a shooting direction of the camera faces a front side of the self-walking device along a traveling direction;

wherein when the processor executes the computer program, the self-walking device performs the following steps:

acquiring a captured image;

processing the captured image to acquire a processed image;

segmenting the processed image into a number of sub-regions;

respectively acquiring a representative pixel point $PL_n$ of each sub-region;

calculating, in the processed image, the number of sub-regions of which the representative pixel point $PL_n$ is located below a comparison pixel point Pc, and marking the number of the sub-regions of which the representative pixel point $PL_n$ is located below the comparison pixel point Pc as a number $N_b$ of special sub-regions, Pc being a preset comparison pixel point;

if $N_{b \leq} 1$, judging that there is a boundary or obstacle in the distance of the captured image;

if $N_{b >} 1$, judging that there is a boundary or obstacle in the vicinity of captured image.

12. A non-transitory computer-readable storage medium having a computer program stored thereon, wherein, when the computer program is executed by a processor, a self-walking device performs the following steps acquiring a captured image;

processing the captured image to acquire a processed image;

segmenting the processed image into a number of sub-regions;

respectively acquiring a representative pixel point $PL_n$ of each sub-region;

calculating, in the processed image, the number of sub-regions of which the representative pixel point $PL_n$ is located below a comparison pixel point Pc, and marking the number of the sub-regions of which the representative pixel point $PL_n$ is located below the comparison pixel point Pc as a number $N_b$ of special sub-regions, Pc being a preset comparison pixel point;

if $N_{b \leq} 1$, judging that there is a boundary or obstacle in the distance of the captured image;

if $N_{b >} 1$, judging that there is a boundary or obstacle in the vicinity of captured image.

* * * * *